United States Patent [19]
Peruglia

[11] 3,719,401
[45] March 6, 1973

[54] SOLENOID-OPERATED HYDRAULIC SWITCHING VALVE

[75] Inventor: Marco Peruglia, Turin, Italy

[73] Assignee: Fiat Societa per Azioni, Turin, Italy

[22] Filed: July 26, 1971

[21] Appl. No.: 166,149

[30] Foreign Application Priority Data

April 28, 1971 Italy..................................68411 A/71

[52] U.S. Cl...............303/21 F, 137/513.3, 137/517, 137/522
[51] Int. Cl.................................................B60t 8/06
[58] Field of Search ..303/21 F; 137/513.3, 517, 522, 137/630.11, 630.14

[56] References Cited

UNITED STATES PATENTS

| | | |
|---|---|---|
| 2,502,525 | 4/1950 | Krugler.........................137/513.3 X |
| 3,389,886 | 6/1968 | Dupont........................137/630.15 X |
| 3,495,882 | 2/1970 | Stelzer..............................303/21 F |

FOREIGN PATENTS OR APPLICATIONS 1,192,300  5/1970  Great Britain....................303/21 F Primary Examiner—Robert G. Nilson
Attorney—Richard C. Sughrue et al.

[57] ABSTRACT

A solenoid-controlled hydraulic changeover valve is described, in which a movable solenoid armature, upon energization of the solenoid, closes a restrictor orifice in a movable obturator and simultaneously presses the obturator on to a seat, cutting off communication between an inlet and outlet; upon subsequent de-energization of the solenoid the fluid pressure derived from the valve inlet keeps the obturator against the valve seat so that the resumed flow of fluid to the outlet port is, at least initially, restricted by the obturator orifice. When the valve is connected in an anti-skid braking circuit in a by-pass line for the pressure fluid source, this mode of operation can be arranged to limit the rate of rise and fall of braking pressure during anti-skid braking modulation.

4 Claims, 2 Drawing Figures

PATENTED MAR 6 1973 3,719,401

INVENTOR
MARCO PERUGLIA

BY Sughrue, Rothwell, Mion, Zinn & Macpeak
ATTORNEYS

SOLENOID-OPERATED HYDRAULIC SWITCHING VALVE

BACKGROUND OF THE INVENTION

The present invention relates to an electrically controlled changeover valve, or electrovalve, for use in hydraulic circuits, particularly, but not exclusively, for effecting change-over of pressure connections in anti-skid braking systems for vehicles.

In general, known anti-skid hydraulic braking systems comprise a controller responsive to predetermined dynamic conditions of one or more wheels indicative of incipient wheel-locking to provide signals for effecting brake release followed by resumption of braking.

The main disadvantages of such known anti-skid hydraulic braking systems lie in the excessive and rapid rise of pressure in the actuator cylinders for the brakes, usually calliper brakes, in the successive cycles of brake application and brake release: this causes jerkiness in the braking of the vehicle, adversely affecting the vehicle's stability and leading to a loss of braking efficiency.

Moreover, if electronic means are used to effect rapid change-over of the pressure connections to a brake actuator there is not in general a correspondingly rapid response on the part of the mechanically moving parts, due to their inertia. It is therefore desirable either to reduce the magnitude of the pressure variations or the rapidity of the pressure variation, to eliminate the above disadvantages.

An object of the present invention is to improve such anti-skid braking systems, limiting both the amplitude and the rapidity of braking pressure variation during both the resumed braking phase in each cycle of anti-skid braking and during brake-release phases.

SUMMARY OF THE INVENTION

According to the invention there is provided an electrically controlled changeover valve, or electrovalve, for use in hydraulic circuits, of the kind having an inlet port and an outlet port and a magnetic armature resiliently biased to a first position and movable to a second position by energization of a solenoid, the valve further having a chamber between the inlet and outlet ports, a movable obturator within the chamber traversed by a flow restrictor opening and urged by resilient biasing means away from a valve seat coaxial with the outlet port, movement of the armature upon energization of the solenoid causing the obturator to press against the valve seat and closing the restrictor opening, thereby cutting off communication between the inlet port and the outlet port, the obturator being maintained in engagement with the valve seat after return of the armature upon subsequent de-energization of the solenoid by the fluid pressure in the chamber derived from the inlet port in use of the valve, so that the resumed flow of fluid from the inlet port to the outlet port is at least initially restricted.

BRIEF DESCRIPTION OF THE DRAWINGS

This invention is hereinafter described, by way of non-limiting example, with reference to the accompanying drawings, in which.

DETAILED DESCRIPTION OF THE ILLUSTRATED EMBODIMENT

Figure 1:
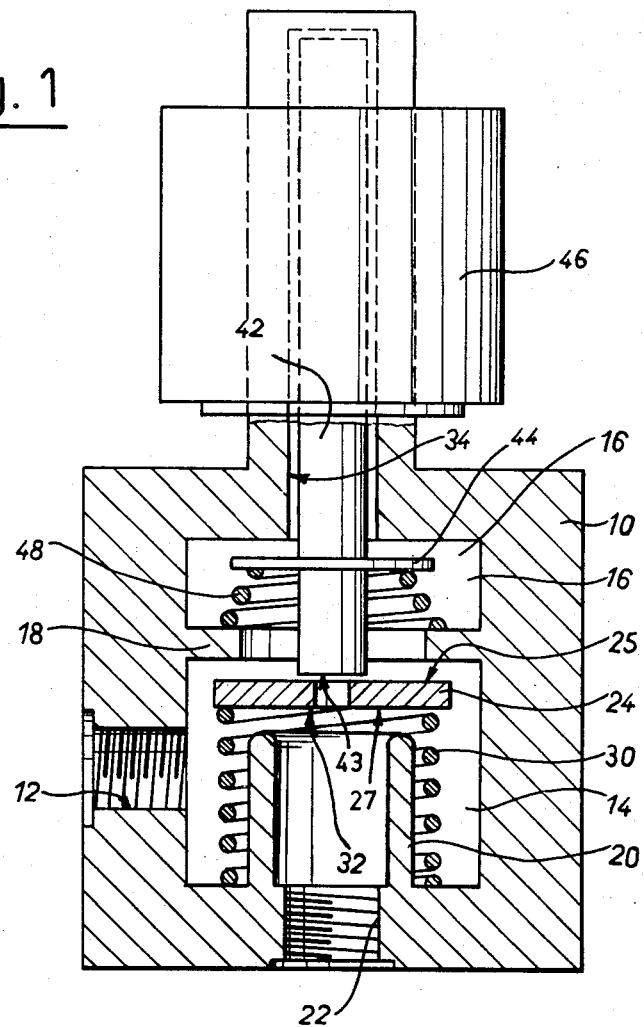
FIG. 1 is a view in axial section of a changeover electrovalve for use in hydraulic circuits, according to one embodiment of this invention.

In FIG. 1, reference numeral 10 indicates generally an electrically controlled changeover valve, commonly referred to as an electrovalve, according to this invention. The body of valve 10 has an internally screw-threaded inlet port 12 which opens into a cylindrical chamber 14 in the body of the valve 10. The chamber 14 is separated from an adjacent coaxial cylindrical chamber 16 by an annular flange 18 with a central circular hole. An annular wall 20 projects coaxially into the chamber 14 from the end wall of the chamber 14 remote from the chamber 16. The wall 20 surrounds an outlet port 22 which is also internally screw-threaded and which is coaxial with the annular wall 20.

A floating obturator constituted by a circular disc 24 is capable of axial displacement in the chamber 14 under the influence of a weak centering and return spring 30. The obturator disc 24 has a central flow restrictor opening 32.

The end wall of the chamber 16 remote from chamber 14 is provided with a tubular extension 34 within which a cylindrical armature 42 of magnetic material is mounted for axial movement. The armature 42 carries within the chamber 16 an annular plate 44. The armature 42 is displaceable under the influence of the magnetic field generated by a solenoid, indicated generally by 46, mounted on the body of the electrovalve 10, in a manner known per se.

A helical spring 48 of conical shape is interposed between the annular plate 44 and the flange 18 to bias the armature 42 away from the obturator disc 24 when the solenoid 46 is de-energized.

Under normal conditions, with the solenoid 46 de-energized and with the armature 42 retracted within the tubular extension 34 under the action of the spring 48, the obturator disc 24 is kept spaced from the annular wall 20 by the spring 30. The valve 10 is therefore open, and fluid under pressure can flow through the chamber 14 from the inlet port 12 to the outlet port 22 without encountering substantial resistance to flow.

If, while pressure is applied at the inlet port 12, the solenoid 46 of the valve is energized the armature 42 is pushed downwards (as viewed in FIG. 1) by the resultant magnetic forces against the action of the spring 48, the end face 43 of the armature 42 pressing against the upper face 25 of the floating obturator disc 24 and thereby closing the opening 32 therein. In addition the obturator disc 24 is pushed downwards, against the very small resistance of the spring 30, until it bears against a valve seat constituted by the upper edge of the annular wall 20, cutting off the outlet port 22 from the chamber 14. The valve 10 is thus closed and the flow of fluid under pressure from the inlet port 12 to the outlet port 22 is interrupted.

If, while maintaining the fluid pressure at the inlet port 12, the solenoid 46 is then de-energized, the armature 42 is retracted into the tubular extension 34 under the influence of the spring 48, releasing the obturator disc 24 and uncovering the aperture 32 in the latter. The fluid pressure in the chamber 14, acting on the upper surface 25 of the obturator disc 24, will always be sufficient to keep the obturator disc 24 pressed against the annular wall 20, since a smaller force will act on the lower annular surface 27 of the disc 24 by virtue of the lower pressure prevailing in the outlet port 22. Consequently the fluid under pressure flows initially from the chamber 14 to the outlet port 22 through the opening 32, which acts as an effective flow restrictor, causing the pressure in the outlet port 22 to rise gradually.

Figure 2:
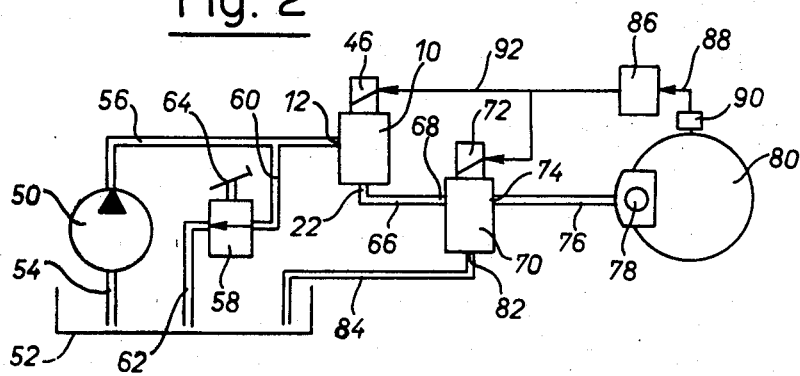
FIG. 2 is a diagrammatic representation of an hydraulic circuit for anti-skid braking of a vehicle wheel, incorporating the electrovalve of FIG. 1.

In order better to understand the manner of operation and advantages of the electrovalve herein described, a preferred application of the electrovalve according to this invention to an anti-skid hydraulic braking system for vehicles will now be described with reference to FIG. 2.

A volumetric hydraulic pump 50 installed in the vehicle (not shown) operates continuously when the vehicle is running to withdraw hydraulic fluid from a reservoir 52 through a conduit 54 and to pump it into a delivery conduit 56. A modulating valve 58 with two channels, and an infinite number of positions between fully open and fully closed, is normally open, interconnecting a branch 60 of the delivery conduit 56 and a discharge conduit 62 leading into the reservoir 52, so that the pressure in the delivery conduit 56 is normally substantially zero.

The modulating valve 58 is closed gradually by the operation of a pedal 64 which gradually restricts the flow of fluid through the valve 58, thereby producing a gradual increase in the fluid pressure in the delivery conduit 56.

The delivery conduit 56 is connected to the inlet port 12 of the electrovalve 10 according to this invention as previously described with reference to FIG. 1. The outlet port 22 of the electrovalve 10 is connected via a conduit 66 to an inlet 68 of an anti-skid hydraulic controller 70 comprising a further electrovalve controlled by a solenoid 72. The controller 70 has a delivery outlet 74 connected through a delivery conduit 76 to a calliper brake actuator 78 acting on a brake disc 80 integral with the wheel (not shown) of a vehicle. The controller 70 also has a discharge outlet 82 connected to a discharge conduit 84 which leads to the reservoir 52.

The hydraulic anti-skid controller 70 is adapted normally to supply the fluid under pressure from the inlet 68 to the delivery outlet 74 when its solenoid 72 is de-energized, and to connect the delivery outlet 74 to the discharge outlet 82 when the solenoid 72 is energized. Many types of anti-skid hydraulic controller exist which operate in this way to modulate the braking pressure applied to the brake actuator in accordance with various programmes and for producing different variations in the braking pressure, to produce an anti-skid effect.

Electrical control signals for the solenoid 72 of the anti-skid hydraulic controller 70 are derived from an anti-skid electrical control device 86, also of known type, controlled in response to an electrical speed signal applied via a line 88 from a speed monitoring device 90 or tachometer associated with the wheel.

The same electrical control signal provided by the control device 86 is also applied via a line 92 to the solenoid 46 of the electrovalve 10 according to this invention. Thus when the controller 70 is operated to close off its inlet 68 and to discharge the fluid under pressure from the delivery conduit 76 to the discharge conduit 84, then the valve 10 is also closed. Discharge of the braking pressure therefore occurs gradually, limiting the amplitude of the modulation of the braking pressure applied to the brake actuator 78, and, therefore, avoiding jerkiness in the resulting braking of the vehicle. With each successive de-energization of the solenoids 72, 46 the anti-skid hydraulic controller 70 re-establishes free communication between its inlet 68 and its delivery outlet 74, while the electrovalve 10 renews the communication between its inlet port 12 and its outlet port 22, via the fluid flow resistance constituted by the opening 32 in the floating obturator disc 24 (FIG. 1).

Consequently the rise of braking pressure at the actuator 78, following each release of the braking pressure, occurs gradually, leading to a complex pressure fluctuation at the brake actuator 78 due to the combined action of the electrovalve 10 according to this invention, and of the anti-skid controller 70, which fluctuation always occurs gradually both during rises and falls of the braking pressure.

I claim:

1. An electrically controlled changeover valve for use in hydraulic circuits, having an inlet port, an outlet port, a control solenoid, a magnetic armature, and means resiliently biasing the armature to a first position, the armature being movable to a second position by energization of the solenoid, and further including the improvement which consists in:

means defining a chamber between the inlet and outlet ports;
a valve seat coaxial with the outlet port;
a movable obturator within the chamber, traversed by a flow restrictor opening, and
resilient biasing means urging said obturator away from said valve seat, said armature upon energization of the solenoid pressing said obturator against said valve seat and closing said restrictor opening, thereby cutting off communication between said inlet port and said outlet port, and said obturator being maintained in engagement with said valve seat, after de-energization of the solenoid, by the fluid pressure in said chamber derived from the inlet port in use of the valve, whereby the resumed flow of fluid from the inlet port to the outlet port is at least initially restricted.

2. Valve according to claim 1 wherein said valve seat coaxial with the outlet port is formed by an annular wall projecting from an end wall of the chamber and surrounding said outlet port.

3. Valve according to claim 1, wherein said resilient biasing means acting on said obturator comprise a helical compression spring interposed between said obturator and the wall of the chamber surrounding the valve seat, said spring also acting as a centering spring.

4. A braking system for a vehicle wheel comprising:
brake actuator means,
fluid pressure source means having control means operable to modulate the output pressure of said source means, an electrically controlled change-over valve having an inlet port, an outlet port, a control solenoid, a magnetic armature, and means resiliently biasing the armature to a first position, said armature being movable to a second position by energization of the solenoid, means defining a chamber between said inlet and outlet ports, a valve seat coaxial with said outlet port, a movable obturator within said chamber traversed by a flow restrictor opening, and resilient biasing means urging said obturator away from said valve seat, said armature upon energization of the solenoid pressing said obturator against said valve seat and closing said restrictor opening thereby cutting off communication between said inlet port and said outlet port, and said obturator being maintained in engagement with said valve seat after de-energization of the solenoid by the fluid pressure in said chamber derived from said inlet port in use of the valve whereby the resumed flow of fluid from the inlet port to the outlet port is at least initially restricted, electrically operated anti-skid control means having an inlet port connnected to the outlet port of said change over valve and an outlet port connected to said brake actuator means, said controller means discharging the pressure to said brake actuator means when energized by an electric signal, and an anti-skid control apparatus sensitive to the wheel speed to energize said control means and the change over valve when needed to prevent skidding of the wheels.

* * * * *